United States Patent Office 2,698,761
Patented Jan. 4, 1955

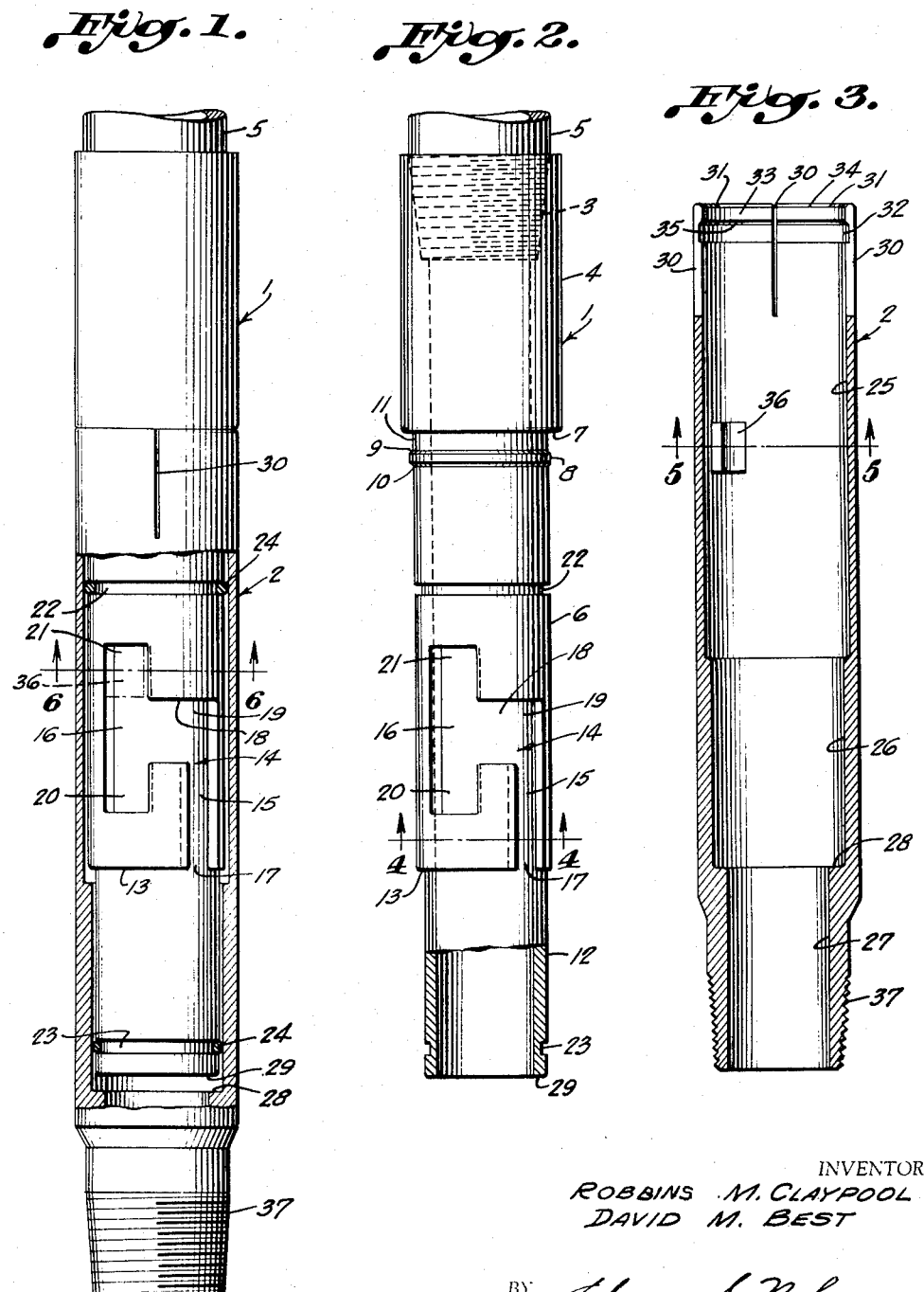

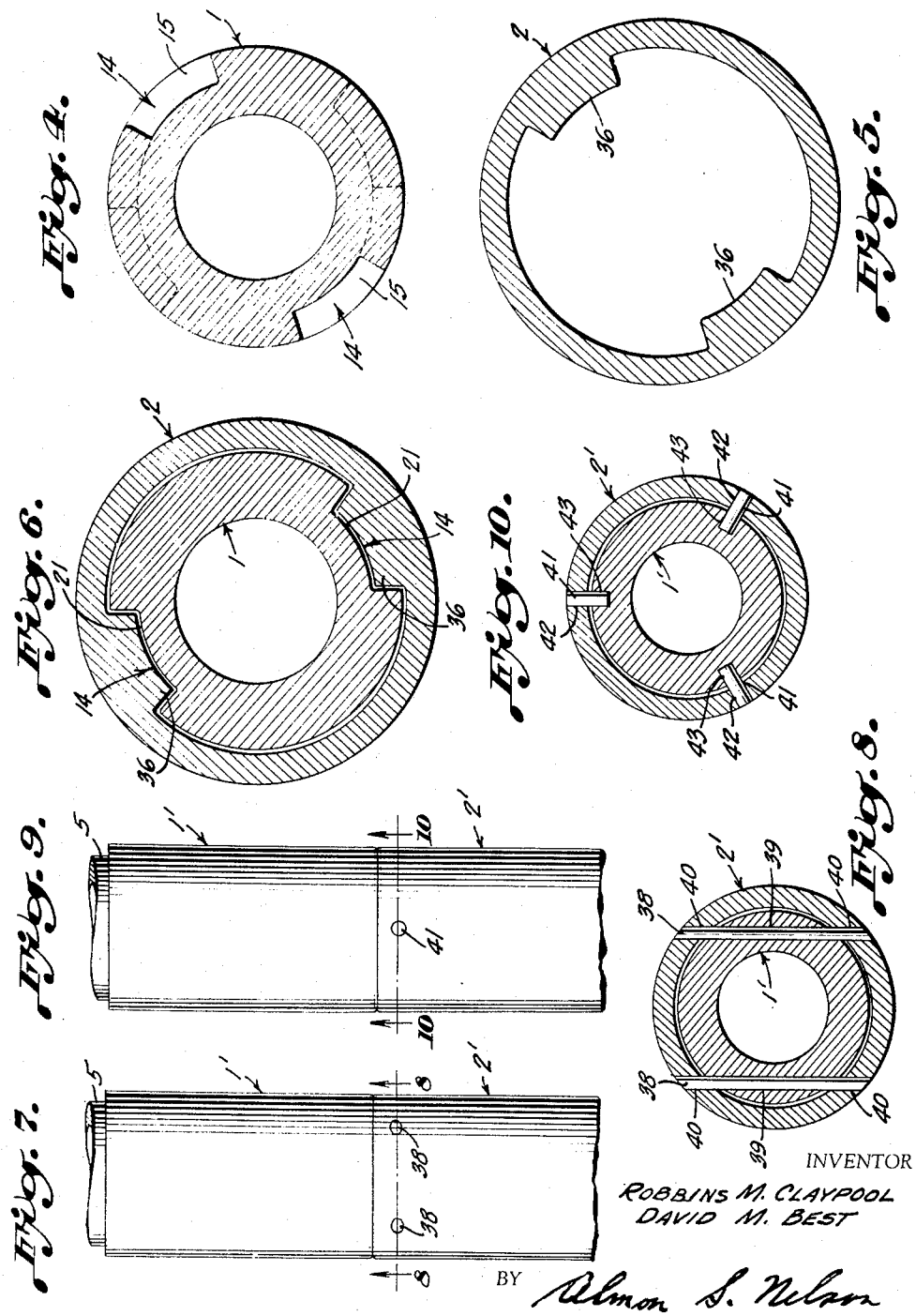

2,698,761

PRODUCTION SAFETY JOINT

Robbins Marshall Claypool, Bellaire, and
David M. Best, Houston, Tex.

Application March 19, 1951, Serial No. 216,342

11 Claims. (Cl. 285—175)

This invention relates to a production safety joint for use in connection with production tubing through which the well is actually produced.

The general purpose of such tubing production safety joints is to effect a positive release of the tubing production string from the production packer when the packer becomes stuck. After the release is accomplished, jars may be inserted and a jarring operation performed to knock the stuck packer loose.

Such tubing safety joints may also be used to kill a high pressure well by simply releasing the joint and pumping mud of sufficient weight into the well bore to control the high pressures which are frequently encountered when beginning a work-over operation. The safety joints of the prior art of which we are aware, usually involve the use of a threaded release means but we have found that threads can seldom be depended upon after exposure to a few years of corrosion, sand, rust, etc. in the bottom of a well. Hence it is one of the primary objects of the present invention to provide a production safety joint consisting of only two members and in which no threaded connections are involved in the release mechanism.

It is a further object of the invention to provide a production safety joint which is leak-proof.

Another object of the invention is to provide such a safety joint in which the strength of the joint is equal to or above the strength of the tubing with which it is run and in which the minimum inner diameter of the joint is no less than the inner diameter of the tubing string with which it is run, and the maximum outer diameter is no greater than the outer diameter of the collars of such tubing string.

It is a further object of the invention to provide a safety joint consisting of two members in which the two members are releasably and re-engageably interconnected by means of substantially J-shaped groove means and co-operating lug means combined with releasable and re-engageable clutch means interlocking the two members in assembled relationship.

It is a further object of the invention to provide a safety joint consisting of two members in which the two members are releasably and re-engageably interconnected by means of substantially J-shaped groove means and co-operating lug means combined with shear pins releasably interlocking the two members in assembled relationship.

Other and further objects of the invention will become apparent as the description proceeds, reference being made to the drawings forming a part of the present disclosure, wherein:

Fig. 1 is a side elevational view of our two-member safety joint connected at one end to a production tubing string, parts being shown in section, and illustrating one form of means releasably interlocking the two members in assembled relationship;

Fig. 2 is a similar side elevational view of one of the tubular members of such safety joint, parts being shown in section;

Fig. 3 is a longitudinal sectional view of the second of the two members comprising the safety joint;

Fig. 4 is an enlarged transverse sectional view taken along the line 4—4 of Fig. 2;

Fig. 5 is an enlarged transverse sectional view taken along the line 5—5 of Fig. 3;

Fig. 6 is an enlarged transverse sectional view taken along the line 6—6 of Fig. 1;

Fig. 7 is a fragmentary side elevational view of our safety joint provided with modified means for releasably interlocking the two members in assembled relationship;

Fig. 8 is an enlarged transverse sectional view taken along the line 8—8 of Fig. 7;

Fig. 9 is a fragmentary side elevational view of our safety joint provided with a further modified form of means for releasably interlocking the two members in assembled relationship; and Fig. 10 is an enlarged transverse sectional view taken along the line 10—10 of Fig. 9.

Referring now in detail to Figs. 1 to 6 of the drawing, in which the preferred embodiment of the invention is illustrated, it will be seen that our production safety joint comprises two tubular members, 1 and 2, the member 1 having a threaded female tubing connection 3 at one end portion 4 thereof adapted to receive the production tubing 5.

In the embodiment of the invention chosen for illustration, the member 1 may be considered the upper member of the safety joint, and the intermediate portion 6 of the tubular member 1 has an external diameter reduced relative to the external diameter of the end portion 4, thereby providing a shoulder 7 at the inner end of such end portion 4.

An outwardly projecting annular member 8 is provided on the intermediate portion 6 of the member 1 adjacent but spaced from the shoulder 7. The side walls or faces 9 and 10 of the annular member 8 are inclined divergently inwardly and as illustrated in Fig. 2, an annular recess 11 is provided between the annular member 8 and the shoulder 7.

The other end portion 12 of the member 1 has a still further reduced external diameter, thereby providing a second shoulder 13 on the member 1.

Diametrically opposed, substantially J-shaped grooves, generally indicated by reference numeral 14, are provided in the intermediate portion 6 of the member 1. Each of the grooves 14 includes two circumferentially spaced, staggered portions 15 and 16 extending in a direction axially of the member 1, the groove portion 15 extending inwardly from and being open at its outer end 17 at the shoulder 13. A circumferentially extending groove portion 18 connects the inner end 19 of the groove portion 15 with the groove portion 16 at a point intermediate the outer and inner ends 20 and 21 respectively thereof. Preferably the depth of the groove 14 is equal to the depth of the shoulder 13 and the longitudinally extending side walls of the groove lie in planes extending radially from the axis of the member 1.

An annular groove 22 is provided on the intermediate portion 6 of the member 1 between the groove 14 and the annular member 8, and a similar second annular groove 23 is provided on the end portion 12 of the member 1. Sealing rings such as the O rings 24 of rubber or other suitable sealing material are provided in the grooves 22 and 23.

The tubular member 2, which in the present case constitutes what may be considered the lower member of the safety joint, is telescopically received over the end portion 12 and the intermediate portion 6 of the tubular member 1.

The tubular member 2 has an internal diameter at one end portion 25 thereof which is substantially equal to the external diameter of the intermediate portion 6 of the tubular member 1. An intermediate portion 26 of the tubular member 2 has an internal diameter substantially equal to the external diameter of the end portion 12 of the tubular member 1. The lower end portion 27 of the tubular member 2 has a still further reduced internal diameter thereby providing an internal shoulder 28 between the intermediate portion 26 and the lower end portion 27 thereof. In assembled relation the shoulder 28 is preferably spaced slightly from the lower end 29 of the member 1 as illustrated in Fig. 1, for a purpose to be later described.

A plurality of circumferentially spaced slits or slots 30 are provided in the end portion 25 of the tubular member 2, said slits extending inwardly in an axial direction from the upper end of such member. In the illustrated embodiment four such slots are illustrated and such slots provide a plurality of transversely arcuate resilient fingers 31 for a reason to be presently described.

An internal substantially annular groove 32 is provided at the upper end of the member 2, said groove being adjacent but spaced from the extreme end of the member 2, thereby providing an inwardly projecting substantially annular member 33 at the extreme end of the member 2. The continuity of groove 32 and member 33 is, of course, interrupted by the slits 30 and each of the fingers 31 is provided therefore with segments of the groove 32 and inwardly projecting annular member 33. The side walls or faces 34 and 35 of the inwardly projecting member 33 are convergently inclined inwardly and are preferably complementary to the side faces 9 and 10 of the outwardly projecting annular member 8 of the tubular member 1. In assembled relationship the groove 32 of the member 2 receives the annular member 8 of the member 1 and the annular recess 11 of the member 1 receives the inwardly projecting substantially annular member 33 of the member 2. The resilient fingers 31 in cooperation with the outwardly projecting member 8 and annular recess 11 on the member 1 thus provide a finger latch or clutch means for releasably and re-engageably interlocking the tubular members 1 and 2 together in assembled relationship.

Diametrically opposed inwardly projecting lugs 36 are provided internally of the end portion 25 of the tubular member 2 inwardly of the slots 30. The lugs 36 are slidably received in the groove 14, and, as illustrated in Fig. 6 and in phantom outline in Fig. 1, in assembled relationship the lugs 36 are positioned in the inner end 21 of the groove portion 16.

The lower end 37 of the tubular member 2 is provided with a threaded male tubing connection adapted to be received in the usual collar provided in a production tubing string. As indicated previously, our safety joint is intended for use in a production tubing string 5 through which the well is actually produced. It is essential therefore that effective means be provided to insure against leakage at the joint and the sealing rings 24 which are closely engaged by the internal surfaces of the member 2 provide an effective seal against leakage.

The releasable and re-engageable clutch means securely interlocks the members 1 and 2 against undesirable release, and the lugs 36, when positioned either in the inner end 21 of the groove portion 16 or in the outer end 20 thereof, prevent relative rotation between the tubular members 1 and 2.

When it is desired to part the joint, tension may be applied to the tubing string 5 sufficient to disengage the resilient finger clutch means and after release of such clutch means, the lugs 36 may be worked through the groove portions 18 and thence through the groove portion 15 to completely disconnect and part the two members. It will be obvious, of course, that the joint may be reconnected without coming out of the well bore by a reversal of the steps just described and the finger clutch means will again interlock the members 1 and 2 in assembled relationship.

It has been pointed out above that the lower end 29 of the member 1 is preferably spaced from the internal shoulder 28 of the member 2. Thus by applying a relatively high fluid pressure within the tubing string, the fluid pressure will act upon the lower end 29 of the member 1 in the same manner as fluid acts upon a piston to move the same in its cylinder and hence fluid pressure may be relied upon if desired to assist in releasing the interlock and in separating or parting the two members of the joint. It is, of course, possible to utilize fluid pressure alone in the separation or parting of the two members.

In the event it is desired to apply an extremely large tensile force on the tubing string and still rotate the string without separation of the joint, this may be done since, upon separation of the finger clutch and upward movement of the member 1, the lugs 36 will merely rest in the outer ends 20 of the groove portions 16 of the grooves 14, thereby preventing separation of the joint regardless of rotation of the string in either direction. After the application of such tensile and rotational forces, the joint may be reassembled and the finger clutch means may be re-engaged to interlock the two members by lowering the upper portion of the tubing string 5 and applying a compressive force on such tubing string if necessary.

The amount of force required to disengage and re-engage the resilient clutch means may be varied in several ways, such as by varying the number and/or the length of the slits 30 provided; by varying the number of outwardly projecting members 8 and cooperating grooves 32; or by varying the angle of inclination of the side faces of the annular interlocking members; and it is within the purview of this invention to vary these various elements of construction in order to vary the force required to release the two members of the joint.

It is to be noted that the latch finger clutch mechanism has been accomplished without sacrifice of either inside minimum diameters or outside maximum diameters in that the safety joint has a maximum outside diameter no larger than the exterior diameter of the tubing coupling and a minimum internal diameter no less than the internal diameter of the tubing string with which it is run.

Furthermore, the use of threads which, as pointed out above, have proven unsatisfactory in use, is entirely eliminated. All of this has been accomplished without a reduction in strength of the joint since our joint is at least as strong or stronger than the tubing with which it is run.

In the modified forms of the invention shown in Figs. 7 to 10, shear pins are substituted for the finger clutch mechanism described above. Otherwise, the joint constructions are the same as the one previously described.

In Figs. 7 and 8, two shear pins 38 extend along opposed chordal lines through suitable openings 39 and 40 drilled through the tubular members 1' and 2' respectively.

In Figs. 9 and 10, a plurality of radially directed shear pins 41 extend through openings 42 drilled in the member 2' into recesses 43 provided in the tubular member 1'.

The shear pins 38 and 41 also provide a means for releasably interlocking the tubular members 1' and 2' in assembled relationship. The shear pins, however, have the disadvantage that once the joint is released, although it can be reconnected by means of the substantially J-shaped grooves 14 and the lugs 36, the two members 1' and 2' cannot again be interlocked together without coming out of the well and replacing the shear pins. For this reason the releasable and re-engageable clutch means is preferred over the use of the shear pins.

While we have disclosed in detail herein certain preferred embodiments of our invention, obvious modifications may occur to those skilled in the art and it is our intention to cover all such modifications as come within the scope of the present invention.

We claim:

1. A safety joint comprising a male tubular member having a tubing connection at one end portion thereof, the intermediate portion of said male tubular member having a reduced external diameter thereby providing a shoulder at the inner end of said one end portion of said member, an outwardly projecting annular member on said intermediate portion adjacent but spaced from said shoulder, the side faces of said annular member being inclined divergently inwardly, the other end portion of said male tubular member having a still further reduced external diameter thereby providing a second shoulder on said male tubular member, a substantially J-shaped groove in said intermediate portion of said male tubular member, said groove including two circumferentially spaced, staggered portions extending in a direction axially of said male tubular member, one of said groove portions extending inwardly from and being open at its outer end at said second shoulder, a circumferentially extending groove portion connecting the inner end of said one of said groove portions with the second of said two groove portions intermediate the outer and inner ends thereof, an annular groove on the intermediate portion of said male tubular member between said J-shaped groove and said outwardly projecting annular member, a second annular groove spaced from said J-shaped groove on said other end portion of said male tubular member, sealing rings in said annular grooves, a female tubular member telescopically received over said other end and intermediate portions of said male tubular member, said female tubular member having an internal diameter at one end portion thereof substantially equal to the external diameter of the intermediate portion of said male tubular member and an internal diameter at an intermediate portion thereof substantially equal to the external diameter of said other end portion of said male tubular member, the internal diameter of the other end portion of said female tubular member being less than the internal diameter of the intermediate portion thereof thereby providing an internal shoulder, said internal shoulder being spaced from said other end of said male tubular member, a plurality of circumferentially spaced slits extending in an axial direction inwardly a sufficient distance from said one end of said second tubular member to form resilient gripping fingers, said one end portion of said female tubular member having an internal annular groove adjacent but spaced from the extreme end of said female tubular member thereby providing an inwardly projecting substantially annular member at such end thereof, the side faces of said last-named annular member being convergently inclined inwardly and complementary to the side faces of said first-named annular member, said internal annular groove receiving said outwardly projecting annular member on said male tubular member with said inwardly projecting annular member on said female tubular member releasably interlocked with said outwardly projecting annular member on said male tubular member, an inwardly projecting lug internally of and on said one end portion of said female tubular member inwardly of said slits, said lug being slidably received in said J-shaped groove and being positioned in the inner end of said second groove portion of said J-shaped groove when said projecting annular members are in interlocked position, and a tubing connection at the other end of said second tubular member.

2. A safety joint comprising a male tubular member having a tubing connection at one end portion thereof, the intermediate portion of said male tubular member having a reduced external diameter thereby providing a shoulder at the inner end of said one end portion of said member, an outwardly projecting annular member on said intermediate portion adjacent but spaced from said shoulder, the side faces of said annular member being inclined divergently inwardly, the other end portion of said male tubular member having a still further reduced external diameter thereby providing a second shoulder on said male tubular member, a substantially J-shaped groove in said intermediate portion of said male tubular member, said groove including two circumferentially spaced, staggered portions extending in a direction axially of said male tubular member, one of said groove portions extending inwardly from and being open at its outer end at said second shoulder, a circumferentially extending groove portion connecting the inner end of said one of said groove portions with the second of said two groove portions intermediate the outer and inner ends thereof, an annular groove on the intermediate portion of said male tubular member between said J-shaped groove and said first-named shoulder, a second annular groove on said other end portion of said male tubular member, sealing rings in said annular grooves, a female tubular member telescopically received over said other end and intermediate portions of said male tubular member, said female tubular member having an internal diameter at one end portion thereof substantially equal to the external diameter of the intermediate portion of said male tubular member and an internal diameter at an intermediate portion thereof substantially equal to the external diameter of said other end portion of said male tubular member, a plurality of circumferentially spaced slits extending in an axial direction inwardly from said one end of said female tubular member, said one end portion of said female tubular member having an internal annular groove adjacent but spaced from the adjacent end of said female tubular member thereby providing an inwardly projecting substantially annular member at such end thereof, the side faces of said last-named annular member being convergently inclined inwardly and complementary to the side faces of said first-named annular member, said internal annular groove receiving said outwardly projecting annular member on said first tubular member with said inwardly projecting annular member on said female tubular member releasably interlocked with said outwardly projecting annular member on said male tubular member, an inwardly projecting lug internally of and on said one end portion of said female tubular member inwardly of said slits, said lug being slidably received in said J-shaped groove and being positioned in the inner end of said second groove portion of said J-shaped groove when said projecting annular members are in interlocked position, and a tubing connection at the other end of said female tubular member.

3. A safety joint comprising a male tubular member having a tubing connection at one end portion thereof, the intermediate portion of said male tubular member having a reduced external diameter thereby providing a shoulder at the inner end of said one end portion of said member, an outwardly projecting annular member on said intermediate portion adjacent but spaced from said shoulder, the side faces of said annular member being inclined divergently inwardly, the other end portion of said male tubular member having a still further reduced external diameter thereby providing a second shoulder on said male tubular member, a substantially J-shaped groove in said intermediate portion of said male tubular member open at its outer end at said second shoulder, an annular groove on the intermediate portion of said male tubular member between said J-shaped groove and said first-named shoulder, a second annular groove on said other end portion of said male tubular member, sealing rings in said annular grooves, a female tubular member having a portion including one end thereof telescopically received over said other end and intermediate portions of said male tubular member, a plurality of circumferentially spaced slits extending in an axial direction inwardly from said one end of said female tubular member, said one end portion of said female tubular member having an internal annular groove adjacent but spaced from the end thereof thereby providing an inwardly projecting substantially annular member at such end, the side faces of said last-named annular member being convergently inclined inwardly and complementary to the side faces of said first named-annular member, said internal annular groove receiving said outwardly projecting annular member on said male tubular member with said inwardly projecting annular member on said female tubular member releasably interlocked with said outwardly projecting annular member on said first tubular member, an inwardly projecting lug internally of and on said one end portion of said female tubular member inwardly of said slits, said lug being slidably received in said J-shaped groove, and a tubing connection at the other end of said female tubular member.

4. A safety joint comprising a male tubular member having a tubing connection at one end portion thereof, the intermediate portion of said male tubular member having a reduced external diameter, with respect to said end portion, thereby providing a shoulder at the inner end of said one end portion of said member, the other end portion of said male tubular member having a still further reduced external diameter thereby providing a second shoulder on said male tubular member, a substantially J-shaped groove in said intermediate portion of said male tubular member, said groove including two circumferentially spaced, staggered portions extending in a direction axially of said male tubular member, one of said groove portions extending inwardly from and being open at its outer end at said second shoulder, a circumferentially extending groove portion connecting the inner end of said one of said groove portions with the second of said two groove portions intermediate the outer and inner ends thereof, an annular groove on the intermediate portion of said male tubular member between said J-shaped groove and said first-named shoulder, a second annular groove on said other end portion of said male tubular member, sealing rings in said annular grooves, a female tubular member telescopically received over said other end and intermediate portions of said male tubular member, said female tubular member having an internal diameter at one end portion thereof substantially equal to the external diameter of the intermediate portion of said male tubular member and an internal diameter at an intermediate portion thereof substantially equal to the external diameter of said other end portion of said male tubular member, an inwardly projecting lug internally of and on said one end portion of said female tubular member, said lug being slidably received in said J-shaped groove and being positioned in the inner end of said second groove portion of said J-shaped groove when said tubular members are in assembled relationship, a tubing connection at the other end portion of said female tubular member, and releasable and re-engageable clutch means for interlocking said tubular members in assembled relationship.

5. A safety joint comprising a male tubular member having a tubing connection at one end portion thereof, the intermediate portion of said male tubular member having a reduced external diameter, with respect to said one end portion, thereby providing a shoulder at the inner end of said one end portion of said male member, the other end portion of said male tubular member having a still further reduced external diameter thereby providing a second shoulder on said male tubular member, a substantially J-shaped groove in said intermediate portion of said male tubular member, said groove including two circumferentially spaced, staggered portions extending in a direction axially of said male tubular member, one of said groove portions extending inwardly from and being open at its outer end at said second shoulder, a circumferentially extending groove portion connecting the inner end of said one of said groove portions with the second of said two groove portions intermediate the outer and inner ends thereof, all of said grooves having a depth less than the thickness of said tubing, a female integral tubular member telescopically received over said other end and intermediate portion of said male tubular member, said female tubular member having an internal diameter at one end portion thereof substantially equal to the external diameter of the intermediate portion of said male tubular member and an internal diameter at an intermediate portion thereof substantially equal to the external diameter of said other end portion of said male tubular member, said last-named end portion having an axial length of substantial extent, said length being greater than the diameter of said end portion, an inwardly projecting lug internally of and on said one end portion of said female tubular member, said lug being slidably received in said J-shaped groove and being positioned in the inner end of said second groove portion of said J-shaped groove when said tubular members are in assembled relationship, and a tubing connection at the other end portion of said female tubular member, means to interlock said male and female members with the end of said female member abutting said first-named shoulder on said male member.

6. The structure defined in claim 5 including means releasably interlocking said male and female tubular members in assembled relationship, said means being operable by axial force.

7. The structure defined in claim 6 wherein said releasable interlocking means comprises a shear pin.

8. A safety joint comprising a male tubular member having a tubing connection at one end portion thereof, the intermediate portion of said tubular member having a reduced external diameter, with respect to said end portion thereby providing a shoulder at the inner end of said one end portion of said male member, the other end portion of said male tubular member having a still further reduced external diameter thereby providing a second shoulder on said tubular member, a substantially J-shaped groove in said intermediate portion of said tubular member, said groove including two circumferentially spaced, staggered portions extending in a direction axially of said tubular member, one of said groove portions extending inwardly from and being open at its outer end at said second shoulder, a circumferentially extending groove portion connecting the inner end of said one of said two groove portions intermediate the outer and inner ends thereof, all of said grooves having a depth less than the thickness of said tubing, an annular groove on the intermediate portion of said male tubular member between said J-shaped groove and said first named shoulder, a second annular groove on said other end portion of said tubular member, sealing rings in said annular grooves, a female tubular member telescopically received over said other end and intermediate portions of said male tubular member, said female tubular member having an internal diameter at one end portion thereof substantially equal to the external diameter of the intermediate portion of said male tubular member and an internal diameter at an intermediate portion thereof substantially equal to the external diameter of said other end portion of said male tubular member, the internal diameter of the other end portion of said female tubular member being less than the internal diameter of the intermediate portion thereof thereby providing an internal shoulder, said internal shoulder being spaced from said other end of said male tubular member, an inwardly projecting lug internally of and on said one end portion of said female tubular member, said lug being slidably received in said J-shaped groove and being positioned in the inner end of the second groove portion of said J-shaped groove when said first and female tubular members are in assembled relationship, and a tubing connection at the other end portion of said female tubular member.

9. The structure defined in claim 8 including means releasably interlocking said first and second tubular members in assembled relationship.

10. The structure defined in claim 9 wherein said releasable interlocking means comprises a shear pin.

11. A safety joint comprising a male tubular member having a tubing connection at one end portion thereof, the intermediate portion of said male tubular member having a reduced external diameter thereby providing a shoulder at the inner end of said one end portion of said member, the other end portion of said male tubular member having a still further reduced external diameter thereby providing a second shoulder on said male tubular member, a substantially J-shaped groove in said intermediate portion of said male tubular member, said groove including two circumferentially spaced, staggered portions extending in a direction axially of said tubular member, one of said groove portions extending inwardly from and being open at its outer end at said second shoulder, a circumferentially extending groove portion connecting the inner end of said one of said groove portions with the second of said two groove portions intermediate the outer and inner ends thereof, all of said grooves having a depth less than the thickness of said intermediate portion, an annular groove on the intermediate portion of said male tubular member between said J-shaped groove and said first named shoulder, a second annular groove on said other end portion of said male tubular member, sealing rings in said annular grooves, a female tubular member telescopically received over said other end and intermediate portions of said male tubular member, said female tubular member having an internal diameter at one end portion thereof substantially equal to the external diameter of the intermediate portion of said male tubular member and an internal diameter at an intermediate portion thereof substantially equal to the external diameter of said other end portion of said male tubular member, an inwardly projecting lug internally of and on said one end portion of said female tubular member, said lug being received in said substantially J-shaped groove and being positioned in the inner end of the second groove portion of said J-shaped groove when said male and female tubular members are in assembled relationship, and a tubing connection at the other end portion of said second tubular member, said sealing rings sealing off said J-slot and lug from liquid inside and outside of said male and female members.

References Cited in the file of this patent

UNITED STATES PATENTS

| Number | Name | Date |
|---|---|---|
| 751,259 | Chaffey | Feb. 2, 1904 |
| 797,796 | Devlin | Aug. 22, 1905 |
| 913,484 | Fairall | Feb. 23, 1909 |
| 1,002,264 | Gribben | Sept. 5, 1911 |
| 1,214,622 | Walker | Feb. 6, 1917 |
| 1,282,681 | Faribault | Oct. 22, 1918 |
| 1,372,238 | Kreiter | Mar. 22, 1921 |
| 1,501,217 | Heeter | July 15, 1924 |
| 1,682,187 | Saunders | Aug. 28, 1928 |
| 2,204,586 | Gran | June 18, 1940 |
| 2,452,219 | Bergvall | Oct. 26, 1948 |
| 2,500,276 | Church | Mar. 14, 1950 |
| 2,535,435 | Massey | Dec. 26, 1950 |
| 2,572,895 | Waggener | Oct. 30, 1951 |